United States Patent Office 3,538,122
Patented Nov. 3, 1970

3,538,122
CATALYTIC PRODUCTION OF MALEIC ANHYDRIDE
Wilhelm Friedrichsen and Hans Joachim Stephan, Ludwigshafen (Rhine), Germany, assignors to Badische Anilin- & Soda-Fabrik Aktiengesellschaft, Ludwigshafen (Rhine), Germany
No Drawing. Original application Feb. 24, 1966, Ser. No. 529,627. Divided and this application Mar. 12, 1969, Ser. No. 806,726
Claims priority, application Germany, Mar. 5, 1965, 1,292,649
Int. Cl. C07c *57/14*
U.S. Cl. 260—346.8    6 Claims

ABSTRACT OF THE DISCLOSURE

Production of maleic anhydride by catalytic oxidation of benzene or olefinically unsaturated linear $C_4$-hydrocarbons, the invention being directed to a specific catalyst containing 2–20% by weight of vanadium pentoxide, 1 to 20% by weight of tungsten trioxide, 1 to 25% by weight of phosphorous pentoxide and 50 to 95% by weight of titanium dioxide.

---

This application is a division of copending application, Ser. No. 529,627, filed Feb. 24, 1966, now abandoned.

This invention relates to the catalytic production of maleic anhydride. More particularly the invention relates to a process for the production of maleic anhydride by oxidation of either benzene or olefinically unsaturated aliphatic hydrocarbons having four carbon atoms in a linear molecular chain, said process being carried out in the presence of a surprisingly advantageous catalyst.

It is known that maleic acid or its anhydride can be prepared by oxidation of benzene or unsaturated aliphatic hydrocarbons having four carbon atoms in a linear molecular chain in the gas phase with oxygen or gases containing oxygen, particularly air, and in the presence of catalysts.

Many different compositions have already been described as catalysts for the production of maleic anhydride. Almost all of these catalysts contain vanadium and/or molybdenum compounds alone or mixed with activating additions of metal oxides, such as zinc, cerium, chromium, titanium, boron, zirconium, bismuth tungsten, lead and cobalt oxides, or also silver, copper, nickel or phosphorus compounds. Alkali metal compounds and alkaline earth metal compounds have also been used as additives.

None of the catalysts described is however entirely satisfactory in the industrial operation of the oxidation of benzene or unsaturated aliphatic hydrocarbons. For the most part the yields or maleic anhydride are unsatisfactory. Often the catalyst will permit only low space velocities. Moreover the life of the catalysts is often unsatisfactory. In particular the yield of maleic anhydride declines markedly after prolonged operation in the case of the prior art catalysts. Another disadvantage is that the catalysts are extremely sensitive to deviations from the optimum temperature. The catalysts may generally only be used either for the oxidation of benzene or only for the oxidation of unsaturated $C_4$-hydrocarbons.

It is an object of this invention to provide a catalyst which permits the production of maleic anhydride in a high yield and with high space velocities. Another object of this invention is to provide a catalyst which has a long life with which no marked decline in the yield of maleic anhydride takes place, even after long periods of operation and which has little sensitivity to deviations from the optimum temperature. Finally it is an object of this invention to provide a catalyst which is very well suited both to the oxidation of benzene and to the oxidation of unsaturated $C_4$-hydrocarbons.

The said and other objects are achieved in accordance with this invention by carrying out the oxidation process in the presence of a catalyst which contains:

(a) 1 to 80%, preferably 2 to 20%, by weight of vanadium pentoxide;
(b) 1 to 40%, preferably 1 to 20%, by weight of tungsten trioxide;
(c) 0.5 to 35%, preferably 1 to 25%, by weight of phosphorus pentoxide; and
(d) 10 to 95%, preferably 50 to 95%, by weight of titanium dioxide.

One of the main advantages of the new catalysts is that they permit production of maleic anhydride in high yields. The new catalysts also permit high space velocities. Even at high space velocities it has not so far been possible to detect fatigue of the catalysts, even in sustained operaion. Furthermore the catalysts may be used both for the oxidation of benzene and for the oxidation of unsaturated aliphatic hydrocarbons having at least four carbon atoms in a linear molecular chain. In particular the catalysts have a substantial insensitivity to changes in temperature so that good conversions and good yields may be achieved at higher or lower oxidation temperatures by adapting the residence times of the hydrocarbon vapor to be oxidized.

The new catalysts are suitable for the production of maleic anhydride from benzene or from olefinically unsaturatd aliphatic hydrocarbons having four carbon atoms in an unbranched molecular chain, such as butene-(1), butene-(2) and butadiene. It is preferred not to use pure olefins, but technical hydrocarbon fractions which have a high concentration of butene and/or butadiene. For example $C_4$-fractions having a content of 10 to 95% of butenes and 1 to 95% of butadiene may be used, and the mixture may contain 1 to 50% of butane, isobutane and/or isobutene. Butane and isobutane are practically not changed under the reaction conditions, while isobutene is burnt. Even amounts of isobutene of for example 10% do not cause any disturbance. The said hydrocarbon fractions may also contain aliphatic saturated and olefinically unsaturated hydrocarbons containing a larger number of carbon atoms than four, for example five or six carbon atoms, but the content of $C_5$- and/or $C_6$-hydrocarbons should advantageously not exceed 20% by weight. It is advantageous to use a mixture of oxygen and nitrogen containing more than 1% of oxygen, preferably air, as the oxygen-containing gas for oxidation of the said hydrocarbons. Pure oxygen may also be used.

The proposed new catalysts contain as their active components vanadium pentoxide $V_2O_5$, tungsten trioxide $WO_3$, phosphorus pentoxide $P_2O_5$ and titanium dioxide $TiO_2$, the titanium dioxide serving at the same time as a carrier material.

The new catalysts contain 1 to 80%, preferably 2 to 20%, by weight of vanadium pentoxide, 1 to 40%, preferably 1 to 20%, by weight of tungsten trioxide, 0.5 to 35%, preferably 1 to 25%, by weight of phosphorus pentoxide and 10 to 95%, preferably 50 to 95%, by weight of titanium dioxide. They preferably consist wholly or substantially of these four oxides. It is possible that in the finished catalyst, the oxides are not present as such but at least partly in chemical combination with each other. The percentages are thus the contents ascertained analytically. Although the catalysts are very suitable both for the oxidation of benzene and for the oxidation of the unsaturated aliphatic hydrocarbons, it is particularly advantageous to use for the oxidation of benzene cataylsts whose content of phosphorus pentoxide is 10 to 100% particularly 35 to 65%, by weight of the amount of tungsten trioxide used, and for the oxidation of unsaturated aliphatic hydrocarbons to use catalysts whose phosphorus pentoxide content is 100 to 1500%, particularly 100 to 600%, by weight of the amount of tungsten trioxide used. The catalyst for the oxidation of $C_4$-hydrocarbons should contain the titanium dioxide advantageously as anatase in an amount of 50 to 100% of the titanium dioxide content, whereas in the oxioation of benzene titanium dioxide having an anatase content, of 20 to 90%, particularly 30 to 70%, is advantageously used as the catalyst component.

The catalysts are prepared by conventional methods, for example by mixing compounds containing vanadium, tungsten and phosphorus which upon being heated are converted into $V_2O_5$, $WO_3$ and $P_2O_5$, or the oxides themselves, advantageously in aqueous solution or suspension, with the carrier material titanium dioxide, with or without the addition of a binder, and shaping the mixture in the usual way into pellets, spheres, or strands which are then dried, preferably at elevated temperature.

Examples of vanadium, tungsten and phosphorus compounds which are suitable for the preparation of the catalyst are: ammonium vanadate, vanadium (IV) oxalate, formate, acetate, tartrate, salicylate or other organic complex compounds of vanadium, tungstic acid, phosphotungstic acid or particularly solutions of tungstic acid in amines, such as ethanolamine, methylamine, diethylamine, trimethylamine, piperidine, with or without the addition of water, phosphoric acid, phosphorous acid, ammonium phosphate, or esters of phosphoric acid or of phosphorous acid.

The catalyst carrier, titanium dioxide, may be used as anatase or as rutile; freshly precipitated titanium dioxide hydrate is also suitable. It is advantageous to use mixtures of anatase and rutile.

The finished catalyst is most effective when the inner surface of the titanium dioxide used as catalyst carrier is from 0.8 to 15, particularly 2 to 10, square meters per gram. This range may easily be achieved in practice by suitable choice of the titanium oxide carrier and by tempering the carrier or the finished catalyst. For example two different types of titanium dioxide having different fineness may be mixed so that the catalyst carrier has the desired inner surface area. The optimum ratio of catalyst components to each other and the optimum inner surface area of the catalyst may easily be determined by experiment.

Production of maleic anhydride using the new catalysts is carried out in the conventional manner for catalytic gas phase reactions. For example the oxygen-containing gas and the hydrocarbon to be oxidized may be premixed so that a gas mixture is formed which contains a maximum of 5% by volume, preferably 0.5 to 2% by volume, of the hydrocarbon to be oxidized, and this may be passed into a vertical reactor of steel, which may if desired by lined with tantalum or titanium and in which the catalyst is stationarily arranged. To remove the heat of reaction, the reactor is advantageously surrounded by a bath of molten potassium nitrate. The hot reaction gas leaving the bottom of the reactor is first cooled indirectly to about 80° C. and then supplied to a water scrubber in which the maleic anhydride is removed from the reaction gas. To estimate selectivity, the content of carbon dioxide and of carbon monoxide in the off-gas may be determined by a continuous analyzer. The wash water containing maleic acid is evaporated under subatmospheric pressure and the maleic acid remaining is separated. Part of the maleic anhydride formed may however be separated in solid or liquid form depending on the partial pressure, by cooling the hot reaction gas, and only the remainder recovered via the water scrubber.

Oxidation is carried out at temperatures of 300° C. to 500° C., particularly 350° to 450° C. The course of the temperature in the layer of catalyst is generally not isothermal. Oxidation is generally carried out at atmospheric or slightly increased pressure, for example at up to 5 atmospheres gauge.

The following examples will illustrate the invention without limiting it. To the expert in this field it will be evident that many cataysts may be prepared according to the present invention. Use is always made of the invention, however, when the catalysts contain the components of the catalysts described in this specification in a predominant amount or when the action of the catalysts is attributable to a substantial extent to the combination of the active components as described in the present specification.

EXAMPLE 1

43.5 g. of tungstic acid is dissolved in 22.5 g. of ethanolamine and 7.5 ml. of water while heating and then a solution, at 95° C., of primary ammonium phosphate in 84 ml. of water is added. A solution of 46.5 g. of vanadyl oxalate in 170 ml. of formamide is allowed to flow rapidly into the said mixture, 660 g. of titanium dioxide is added and the whole is kneaded to a thick viscous mixture which is then spread on perforated plates for shaping. The whole is dried for twelve hours at 90° C. and then heated for another six hours at 200° C. Hard cylinders having a height and diameter of 5 mm. are obtained. The catalyst contains 2.7% by weight of $V_2O_5$, 5.5% by weight of $WO_3$, 2.1% by weight of $P_2$ and $O_5$ and 89.7% by weight of $TiO_2$. The titanium dioxide used as the catalyst carrier has an inner surface area of 10 square meters per gram. 310 ml. of this catalyst is placed in a vertical tube having an internal width of 25 mm. which is heated by a salt bath. The height of the filling is 60 cm. 8.6 g. per hour of gaseous benzene mixed with 377 liters of air is passed at 380° C. over this layer of catalyst. The maleic anhydride formed is scrubbed out in a packed column and determined titrimetrically. 89% by weight maleic anhydride is obtained.

EXAMPLE 2

43.5 g. of tungstic acid is dissolved with heating in 22.5 ml. of ethanolamine and 7.5 ml. of water and then a hot solution (95° C.) of 24 g. of primary ammonium phosphate in 84 ml. of water is added. A solution of 46.5 g. vanadyl oxalate in 170 ml. of formamide, prepared at 125° C., is then allowed to flow rapidly into the said mixture, a mixture of 360 g. of rutile and 300 g. of anatase is added and the whole is kneaded to form a thick viscous mixture which is then spread on a perforated plate for shaping. After the product has been dried for twelve hours at 90° C. and heated for another six hours at 200° C., hard cylinders are obtained having a height and diameter each of 5 mm. The catalyst contains 2.7% by weight of $V_2O_5$, 5.5% by weight of $WO_3$, 2.1% by weight of $P_2O_5$, 40.8% by weight of $TiO_2$ as anatase and 48.9% by weight of $TiO_2$ as rutile. The titanium dioxide used as catalyst carrier has an inner surface area of 4.3 square meters per gram.

310 ml. of this catalyst is placed in a vertical tube having an internal width of 25 mm. and heated by a salt bath. The height to which the tube is filled is 60 cm. 8.6 g. of gaseous benzene mixed with 377 liters of air is passed at 380° C. over this catalyst layer per hour. The maleic anhydride formed is scrubbed out in a packed column with water and determined titrimetrically. 10 g. of maleic acid is obtained per hour. This is equivalent to a weight yield of 116% or a theoretical yield of 78%.

EXAMPLE 3

A hot solution (125° C.) of 140 g. of vanadyl oxalate in 350 ml. of formamide is rapidly mixed with a hot solution (90° C.) of 132 g. of tungstic acid in 68 ml. of ethanolamine and 24 ml. of water to which previously a hot solution (80° C.) of 110 g. of primary ammonium phosphate in 330 ml. of water has been added. Into the whole mixture, 1400 g. of rutile and 600 g. of anatase are stirred and the viscous composition is then spread on a perforated plate to form cylinders. Drying is carried on for twelve hours at 90° C. and then the catalyst is heated for five hours at 250° C. and muffled for twelve hours at 500° C. The catalyst contains 2.6% by weight of $V_2O_5$, 5.4% by weight of $WO_3$, 3.0% by weight of $P_2O_5$, 26.8% by weight of $TiO_2$ as anatase and 62.2% by weight of $TiO_2$ as rutile. The titanium dioxide used as catalyst carrier has an inner surface area of 3.4 square meters per gram. 300 ml. of this catalyst is filled into the reactor of Example 1 and 670 liters per hour of air is passed through with 24 g. of vaporous benzene at 420° C. 26.4 g. per hour of maleic acid is obtained. This is equivalent to a weight yield of 110% or a theoretical yield of 74%.

EXAMPLE 4

11 g. of tungstic acid is dissolved in 10 ml. of ethanolamine and 3 ml. of water while hot and then 77 ml. of 85% phosphoric acid is added. A solution of 78 g. of vanadyl oxalate in 60 ml. of formamide prepared at 120° C. is added to this solution followed by a mixture of 250 g. of anatase and 60 g. of rutile. The whole is kneaded and the composition then shaped into pellets as in Example 1. The finished catalyst contains 2.6% by weight of $WO_3$, 8.5% by weight of $V_2O_5$, 12.2 by weight of $P_2O_5$, 61.4% by weight of $TiO_2$ as anatase and 15.3% by weight of $TiO_2$ as rutile. The catalyst carrier (titanium dioxide) has an inner surface area of 3.2 square meters per gram.

1200 liters of air and 30 g. of a gaseous butene mixture (containing 80% of butene-(1) and butene-(2) as well as butane and isobutylene) are passed per hour at 410° C. over 300 ml. of this catalyst in a reactor as in Example 1. 25.6 g. of maleic acid is formed per hour. 1.5 g. of lower monocarboxylic acids is also formed. The weight yield of maleic acid (calculated on reactable butene-(1) and butene-(2)) is 106.7%. The theoretical yield is 51.5%.

The invention is hereby claimed as follows:

1. In a process for the production of maleic anhydride by the catalytic oxidation of benzene or olefinically unsaturated aliphatic hydrocarbons having four carbon atoms in a linear molecular chain, the improvement which comprises carrying out said oxidation in the presence of a catalyst containing 2 to 20% by weight of vanadium pentoxide, 1 to 20% by weight of tungsten trioxide, 1 to 25% by weight of phosphorous pentoxide and 50 to 95% by weight of titanium dioxide, with the proviso that the content of phosphorous pentoxide is 10 to 100% by weight of the tungsten trioxide content when oxidizing benzene and 100 to 1500% by weight of the tungsten trioxide content when oxidizing said unsaturated aliphatic hydrocarbons.

2. A process as claimed in claim 1 wherein the titanium dioxide of said catalyst has an inner surface area of about 0.8 to 15 square meters per gram.

3. A process as claimed in claim 1 wherein the titanium dioxide of said catalyst has an inner surface area of about 2 to 10 square meters per gram.

4. A process as claimed in claim 1 wherein said oxidation is carried out in a temperature range of from about 350° C. to 450° C. and at atmospheric pressure up to about 5 atmospheres gauge.

5. A process as claimed in claim 1 wherein benzene is oxidized and the content of phosphorous pentoxide in the catalyst is 10 to 100% by weight with reference to the tungsten trioxide.

6. A process as claimed in claim 1 wherein an olefinically unsaturated aliphatic hydrocarbon having four carbon atoms in a linear molecular chain is oxidized and the content of phosphorous pentoxide in the catalyst is 100 to 1500% by weight with reference to the tungsten trioxide.

References Cited

UNITED STATES PATENTS 3,086,026   4/1963   Wiebusch et al. _____ 260—346.8
3,168,572   2/1965   Voge et al. _____ 252—467

FOREIGN PATENTS 692,731   8/1964   Canada.

ALEX MAZEL, Primary Examiner
B. I. DENTZ, Assistant Examiner

U.S. Cl. X.R.
252—435

PO-1050
(5/69)

UNITED STATES PATENT OFFICE
CERTIFICATE OF CORRECTION

Patent No. 3,538,122      Dated November 3, 1970

Inventor(s) Wilhelm Friedrichsen et al

It is certified that error appears in the above-identified patent and that said Letters Patent are hereby corrected as shown below:

Column 3, line 8, "oxioation" should read -- oxidation --.

Column 4, line 27, "$P_2$ and $O_5$" should read -- $P_2O_5$ --.

SIGNED AND SEALED
FEB 2 1971

(SEAL)
Attest:

Edward M. Fletcher, Jr.
Attesting Officer

WILLIAM E. SCHUYLER, JR.
Commissioner of Patents